United States Patent
Holland

[11] 3,885,332
[45] May 27, 1975

[54] ELEVATING BELT LOADER AND EXCAVATION APPARATUS WITH MATERIAL FLOW CONTROL

[76] Inventor: Francis H. Holland, 32nd St. West & Hesper Rd., Billings, Mont. 59102

[22] Filed: Apr. 26, 1974

[21] Appl. No.: 464,292

[52] U.S. Cl. ........................ 37/102; 37/4; 37/110
[51] Int. Cl. ............................................. E02f 5/00
[58] Field of Search .................. 37/110, 102, 4, 8

[56] References Cited
UNITED STATES PATENTS

| | | | |
|---|---|---|---|
| 2,386,187 | 10/1945 | Armington et al. | 37/110 |
| 2,618,083 | 11/1952 | Armington et al. | 37/110 |
| 3,474,547 | 10/1969 | Campbell et al. | 37/8 |
| 3,530,599 | 9/1970 | Holland | 37/110 |
| 3,574,960 | 4/1971 | Peterson et al. | 37/4 |
| 3,616,553 | 11/1971 | Holland | 37/110 |
| 3,735,509 | 5/1973 | Condra | 37/8 |

*Primary Examiner*—Clifford D. Crowder
*Attorney, Agent, or Firm*—Robert G. McMorrow

[57] ABSTRACT

A horizontal platform supported between trailing and leading prime movers supports a rearwardly inclined, transversely extending, horizontal excavating blade at the leading end of the platform, defining a horizontal cutting edge. A first longitudinally disposed endless belt conveyor has its leading end disposed below and adjacent the trailing edge of the horizontal blade to receive excavated earth which moves upwardly and rearwardly along the platform. A second transverse, endless belt conveyor positioned to the rear and slightly below the discharge end of the longitudinal belt conveyor transports the excavated earth to the side of the platform, for discharge into an underlying haul unit. The rear end of the platform is coupled to the track center of the trailing prime mover by paired booms which pivot about the horizontal axis passing through the trailing prime mover. A hydraulic cylinder independently raises and lowers one side of the platform coupled to the trailing prime mover boom closest to the discharge end of the transverse endless conveyor to adjustably tilt the discharge end of the transverse conveyor to permit the loader and excavation apparatus to conform to the vertical dimensions of the haul unit. A transverse gate which is convex in lateral cross section facing the blade is mounted to the platform above the horizontal excavation blade and pivots about a horizontal axis as the rear of the gate to vary the size of the throat formed between the gate and the horizontal blade. The variable throat directs the excavated material onto the blade and controls the rate of flow of excavated material over the blade and onto the conveyor. A hydraulic cylinder carried by the platform and operatively coupled to the gate pivots the gate to vary throat size and gate surface attitude.

13 Claims, 3 Drawing Figures 3,885,332

ELEVATING BELT LOADER AND EXCAVATION APPARATUS WITH MATERIAL FLOW CONTROL

BACKGROUND OF THE INVENTION

1. Field of the Invention

This invention relates to a combined elevating belt loader and excavation apparatus of the type shown in U.S. Pat. No. 3,616,553, and more particularly, to such apparatus which employs dual endless conveyors to facilitate the transfer and loading of excavated earth or like material onto a haul unit such as a truck, and the flow rate of the excavated earth being fed by the conveyor system.

2. Description of the Prior Art

The referred to patent is directed to a type of elevating belt loader and excavation apparatus which takes the form of a horizontal platform which is essentially devoid of an undercarriage and supports at least one excavating blade for depositing excavated earth on an endless conveyor which is adapted to discharge the material to the side of the platform. The platform is coupled at leading and trailing ends to respective prime movers, the leading prime mover being coupled to the platform by way of orthogonal axes which permit the platform to be raised and lowered vertically, controlling the depth of cut of the horizontal cutting excavation blade. The rear end of the platform is coupled to the trailing prime mover by paired booms or arms which, in turn, pivot about a horizontal axis passing through the prime mover track center. The connections are loosely made and hydraulic means independently raises and lowers one side of the platform coupled to the arms about a longitudinal axis extending through the other arm and the platform to effect inclination of the cutting blade at the leading end of the apparatus.

While such excavation apparatus operates satisfactorily and permits removal of earth after cutting by either a horizontal cutting blade or a combination of a horizontal blade and a vertical blade, there has been experienced some difficulty in controlling the flow of material from the cutting blade to the endless belt conveyor which leads the material to one side of the unit and raises it above a haul unit such as a truck or open bed trailer positioned in side by side relationship thereto.

Further, the arrangement of a cutting blade at the forward end of the platform does not necessarily insure that all of the earth being excavated by the blade cutting edge is directed onto the blade and over its trailing end onto the conveyor belt. Further, the amount of material being deposited on the belt at any instant may vary to such an extent that unequal loads are experienced by the belt with resulting stress and strain and rapid deterioration of the equipment. Finally, where a single endless conveyor belt is employed whose longitudinal axis lies generally at right angles to the longitudinal axis of the platform between the prime movers, it is difficult to raise the excavated material sufficiently to permit its discharge from a height sufficient to feed the many different sized haul units whose beds, sidewalls, etc., vary considerably in height.

SUMMARY OF THE INVENTION

The present invention is directed to such an excavation and conveying apparatus which includes a horizontal loader platform movable relative to a stationary earth formation and supported between leading and trailing prime movers. The platform has fixedly secured thereto a rearwardly and upwardly inclined, rectangular excavation blade defining a horizontal cutting edge, with the blade extending generally transverse to the longitudinal axis of the platform. A first upwardly and rearwardly inclined longitudinal endless conveyor belt is mounted for rotation on the horizontal platform with its leading end underlying the trailing edge of the horizontal excavation blade with the first endless conveyor belt extending lengthwise of the platform. A second transverse endless conveyor belt is mounted for rotation below and just to the rear of the raised trailing end of the first endless conveyor belt for receiving excavated material raised thereby and for transporting the material laterally or transversely to a position to one side of the platform and above an underlying haul unit, moved into position therebeneath. The rear end of the platform is coupled to the track center of the trailing prime mover by paired booms which in turn pivot about a horizontal axis passing through the prime mover and which are loosely coupled at their forward ends to respective sides of the platform. A hydraulic ram operatively coupled to the boom on the same side of the platform as the discharge end of the transverse endless conveyor belt and to the platform at a point above the connecting point of that boom to the platform, permits, by extension of the piston rod of the hydraulic ram, pivoting of the platform about a horizontal axis extending through the other boom on the opposite side of the platform to effectively swing the discharge end of the transverse conveyor belt through a relatively large arc to allow the apparatus to adapt itself to haul units of varying height. The machine is also enabled to level rough side hill cuts.

A larger excavator may be provided for higher haul units.

The excavation and conveying apparatus of the present invention is further provided with a gate extending transversely across the platform, above the blade and pivotable near its rear, about a transverse horizontal axis so as to form with the underlying horizontal excavation blade, a variable throat leading onto the blade and towards the longitudinal endless conveyor belt. The gate may be formed of a metal plate which is convex in lateral cross section facing the blade, such that the throat narrows towards the center of the blade from the cutting edge and widens from the center towards the trailing edge of the blade to restrict material input to the conveyor but allow controlled material to freely ride over the blade trailing edge and fall onto the conveyor belt. A pair of diverging deflecting panels are fixed to the platform and extend fowardly from a position to the rear of the leading end of the longitudinal endless conveyor belt, past the horizontal excavation blade. The deflecting panels act in conjunction with the gate for facilitating the deposition and controlled flow of excavated earth onto the leading end of the longitudinal endless conveyor.

A hydraulic cylinder mounted to the platform and centered relative to the gate, has an extendable and retractable piston rod fixed at its outboard end to the gate, forward of the pivot axis, to selectively adjust the size of the throat.

DESCRIPTION OF THE PREFERRED EMBODIMENT

Figure 1:
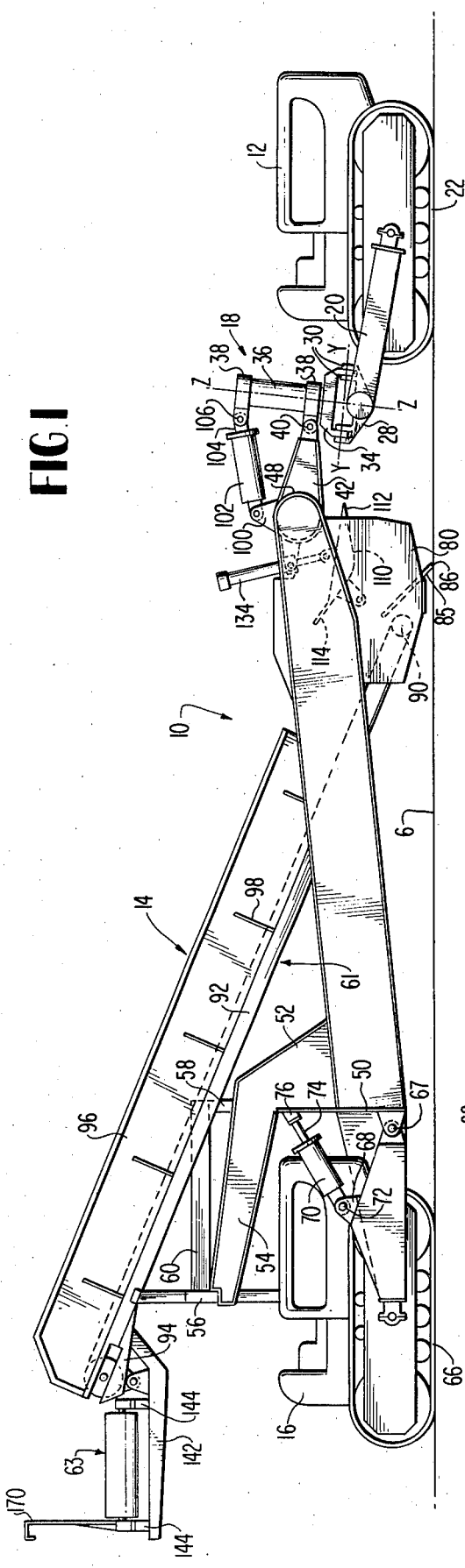
FIG. 1 is a side elevational view of the improved excavation and conveying apparatus of the present invention including leading and trailing prime movers for facilitating operation of the same.

Referring to the drawings, the improved elevating belt loader and evacuation apparatus of the present invention identified generally at 10 consists in the illustrated form, in three main components; a leading prime mover 12, an intermediate excavation and conveying assembly 14, and a trailing prime mover 16. The prime movers 12 and 16 are preferably of the crawler type. However, any other class or type of prime mover suitable to the particular conditions of use and terrain may be incorporated into the assembly. In many respects, the assembly 14 and the interconnection between the same are identical to the arrangement of the referred to patent. In this regard, the prime movers per se are conventional but they are modified with respect to a front hitch assembly 18 operatively coupling the leading prime mover 12 to assembly 14 and the means for mounting the aft or trailing end of the excavator and conveying assembly 14 to the trailing prime mover 16. The leading prime mover 12 employs a pair of rearwardly directed arms or booms 20 to the sides of tracks 22 which are mounted for pivoting about a horizontal axis X—X, FIG. 2, at the forward end and which are coupled together at the rear by transversely extending cylinder or tube 26 whose ends are fixed respectively to booms 20 by being welded thereto. Centrally of cylinder 26, is a bracket 28 which may be welded to the cylinder and carries at fore and aft locations, pairs of upstanding ears 30 and defining in conjunction with plate 34, a pin and clevis coupling arrangment. This allows the plate 34 to pivot about an axis Y—Y at right angles to the horizontal pivot axis X—X of boom 20. A third orthogonal axis Z—Z is defined by cylinder 36 which is concentrically mounted on an upstanding post 37, FIG. 3, fixed to the plate 34 and extending upwardly therefrom. collars 38 are fixed to the cylinder 36 near the top and bottom of the cylinder and rotate therewith, thus this assembly defines orthogonal pivot axes which facilitate the raising and lowering of assembly 14 as well as permitting the tractor driven apparatus to turn laterally as it is being moved forwardly to effect the desired earth excavation.

The lower collar 38 is pivotably coupled by pivot pin 40 to laterally spaced arms 42 forming a fixed extension portion to platform 44. Platform 44 generally comprises an open rectangular frame defined by side frame members 46 welded or coupled together at the leading end of platform 44 by a cylindrical or tubular member 48 which preferably is welded at its ends to the inside walls of the side frame members 46. The platform at the rear of frame members 46 is joined together by a transversely extending vertical plate 50, the side frame members 46 being further provided with frame extension member 52 on each side of the platform which are generally L-shaped in configuration and which extend further aft, such that horizontal portions 54 thereof, overlie the rear prime mover 16 and are spaced somewhat above the same. Transverse frame members 56 and 58 span the extension member 52 and the left frame 46 which extends to the centerline of the rear tractor and supports therebetween an engine base mount 60 which supports at the left rear corner of the platform 44 and above the rear prime mover 16, an internal combustion engine 62A which provides the motive power for dual conveyors indicated generally at 61 and 63. Additional frame members other than those illustrated may be employed to define struts and braces for assembly 14, the platform 44 being an essentially rigid assembly, coupled to the leading prime mover by front hitch assembly 18 permitting orthogonal movement relative thereto. However, with respect to the rear prime mover 16, in a manner similar to the referred to patent, the prime mover is provided on respective sides with arms or booms 62 and 64, FIG. 2. The boom 62 comprises an extension of the left side frame 46. Booms 62 and 64 are mounted for pivoting about a horizontal axis passing through tracks 66. The left side boom 62 is loosely fixed at its forward end to vertical plate 50. The right side boom 64 is modified somewhat to the extent that while it is provided with a loose pivot coupling 67 to vertical plate 50, it is further provided with a fixed ear 68 to which one end of a hydraulic cylinder 70 is pivotably mounted by pin 72, the cylinder 70 having a piston rod 74 extending outwardly thereof and being extensible and retractable, and being fixed at its outer end by coupling 76 to one side of vertical plate 50, above boom connection 67.

At the forward end of the platform 44, there are provided deflecting side panels 80, which consist essentially of metal plates which are welded to the inside wall of the platform side frame members 46, having inclined trailing portions 82 which terminate adjacent respective sides of a longitudinal endless conveyor belt 84. Welded between the deflecting side panels 80 and extending transversely of the platform 44 in a downwardly and forwardly inclined manner, is a horizontal excavation blade 85 whose leading edge 86 projects below the bottom edge of side panels and makes contact with the ground to effect excavation of the ground G forcing it to move rearwardly, upwardly and over the trailing edge 88 of the blade. In this respect, the conveyor belt 84 is shown as being trained over a leading or loading end support tail roll 90 and spans the length of spaced parallel conveyor support beams 92 which extend between the side frame members 46 and are suitably welded to side panels 80 and transverse frame members 56 and 58 at opposite ends. With the leading end 94 of the side panels 80 extending beyond the leading edge 86 of the horizontal blade 85, the amount of material to be excavated and transported up the inclined longitudinal endless conveyor 84 is partially determined by these three members.

The endless conveyor belt 84 is trained at its aft end over a driven roller 94A. In order to insure that the material being conveyed does not fall off of the longitudinal endless conveyor 84, sidewalls 96 extend essentially the full length of that conveyor, at least from the upper run of belt 84 upwardly, the sidewalls 96 being fixed to the framework by appropriate means including strengthening ribs 98.

In the manner of the referred to patent, cylinder 48 is provided with a pair of ears 100 which extend upwardly, and have pin connected thereto one end of the front hitch hydraulic control cylinder 102, the cylinder 102 having extending therefrom a piston rod 104 which is extensible and retractable therein by hydraulic fluid acting selectively on the sides of a piston (not shown) fixed to the rod interiorly of the cylinder. The piston rod 104 is pin coupled at 106 to the upper collar 38 which is welded to cylinder 36 of the front hitch assembly 18. With arms 42 pin coupled to the lower collar 38 by way of pin 40, extension of the piston rod 104 causes the frame 44 to be raised vertically at its forward end, raising and lowering in turn, the horizontal blade cutting edge 86 and varying the depth of the cut thereby. This action is similar to the action of the equivalent mechanism in the referred to patent.

Important to the present invention is the employment of a gate 110 of special configuration which acts in conjunction with side panels 80 and the horizontal excavation blade 85 to vary the size of a throat or funnel which is formed therebetween for controlled feeding of excavated material up and over the horizontal blade 85 and onto the top run of the endless longitudinal conveyor belt 84. In this respect, the gate 110 consists essentially of a metal plate which is bent about a transverse line to provide a generally convex cross section facing the horizontal excavation blade. The gate 110 is thereby provided with a front surface portion 112 which flares outwardly from its center away from the blade 85 and a rear surface portion 114 which also flares outwardly, away from its center and relative to the underlying horizontal excavation blade 85. Thus, the minimum cross sectional area between the gate 110 and the horizontal excavation blade 85 is at a point intermediate of the leading cutting edge 86 of the blade and the trailing edge 88. At respective sides of the gate 110, the gate is provided with ears 116 which depend downwardly from the rear surface portion 114 and the gate is pivoted to the panels 80 by way of pivot pins 118. Thus, the gate 110 pivots about a horizontal axis which lies to the rear of the center line of the gate. In order to effect pivoting of the gate to control the throat dimensions, the gate at its lateral center, is provided with rib 120 having a flat upper edge 122. Mounted to opposed sides of the rib 120 and extending above the upper edge 122 are a pair of ears 124 which support a pivot pin 126 passing horizontally therethrough. The cylinder 48 defining a portion of the platform frame is also provided with ears 128 which act to support therebetween on a pivot pin 130, a collar 132. The collar 132 supports a gate control hydraulic cylinder 134 such that the cylinder may pivot about the pivot axis pin 130. Protruding from cylinder 134 is a piston rod 136 which is extensible and retractable relative to the cylinder in response to hydraulic fluid being applied to respective sides of a piston (not shown) fixed to rod 136, internally of the cylinder. The outboard end of rod 136 causes the gate 110 to pivot about pivot pins 118 on ears 116 and move from the full line position shown in FIG. 3, to the dotted line position, greatly reducing the size of the throat through which the excavated material must pass, as the apparatus is forcibly moved over the ground to effect earth removal.

By having portions flared in opposite directions, the center portion of the gate when acting in conjunction with the planar excavation blade 85 will determine the maximum flow rate of excavated material onto the upper run of the conveyor belt 84, upon dropping off the trailing edge 88 of the blade. At the same time, the flared front surface portion 112 of the gate will tend to press the excavated material downwardly towards the excavation blade to prevent the material curling up and forwardly away from the longitudinal conveyor, as would occur in the absence of the gate. Further, the fact that the rear surface portion 114 of the gate flares upwardly and away from the trailing edge 88 of the blade and from the conveyor 84 readily permits this controlled flow rate of material to fall onto the conveyor, but in itself does not determine the maximum amount of material permitted to pass through the throat created by members 80, 85 and 110. Thus, the two surface portions 112 and 114 hold the material down and onto the blade 85 and guide the material toward the conveyor 61. Without the gate, the material deflects vertically foward towards the leading track resulting in a waste of power, since it must again be picked up by the blade and finally discharged over trailing edge 88 onto the conveyor belt 84.

In additon to the longitudinal endless conveyor 61, the present invention makes advantageous use of a transverse endless conveyor 63. In that respect, the platform 44 further carries additional frame members such as longitudinal frame members 142 at laterally spaced positions joined in turn by transverse frame members 144 which act to support at respective ends rollers (not shown) upon which is trained an endless transverse conveyor belt 146. The transverse frame members 144 extend somewhat beyond the left side of the longitudinal endless conveyor 61, FIG. 2, and the transverse frame members 144 extend well beyond the right side of the longitudinal endless conveyor 61. By driving the endless conveyor belt 146 from left to right, FIG. 2, the excavated material is discharged well to the right side of the platform 44 and that of the trailing prime mover 16. In order to effect a positive drive to both conveyors 61 and 63, the engine 62A is coupled by way of torque converter 150, transmission 152 through shaft connections 154 and 160, respectively, to a longitudinal conveyor gear box 166. By way of a drive connection (not shown) made from gear box 166 directly to head roller 94A, roller 94A supporting the upper end of the longitudinal endless conveyor belt 84 is driven. Further, a transverse conveyor gear box 164 connected also to a shaft below shaft 160 provides the necessary drive through shaft to the left side roller (not shown) supporting the endless conveyor belt 146. In order that the material will not fall off the lateral transverse endless conveyor belt 146, a vertical sidewall 170 rises upwardly from frame members 144 and is fixed thereto.

Thus, the dual conveyor system is powered by a single internal combustion engine 62A which is mounted above the trailing prime mover or rear tractor 16 at the head of the longitudinal conveyor. Preferably, the trailing prime mover 16, and both conveyors 61 and 63, as well as hydraulic cylinders 70, 134 and 102, are controlled from the leading prime mover. Purposely, hydraulic leads have been left out of the illustrated embodiment but are conventional in form and function. The transmission 152 preferably takes the form of a spur gear and chain type transmission which splits the engine power to separate drive shafts such as shaft 154 which directs power to the head pulley gear boxes 164 and 166 of the transverse and longitudinal belt conveyors.

Figure 2:
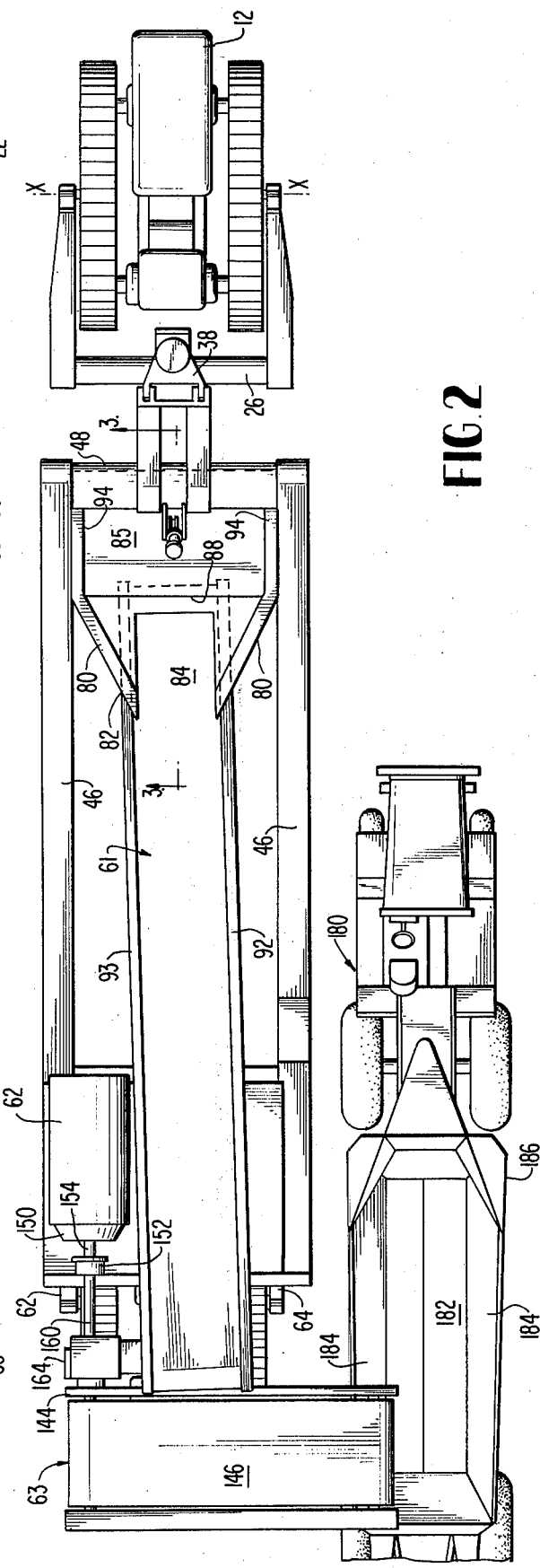
FIG. 2 is a top plan view of the apparatus of FIG. 1 with a haul unit positioned below the discharge end of the transverse endless conveyor belt to receive excavated material.
Figure 3:
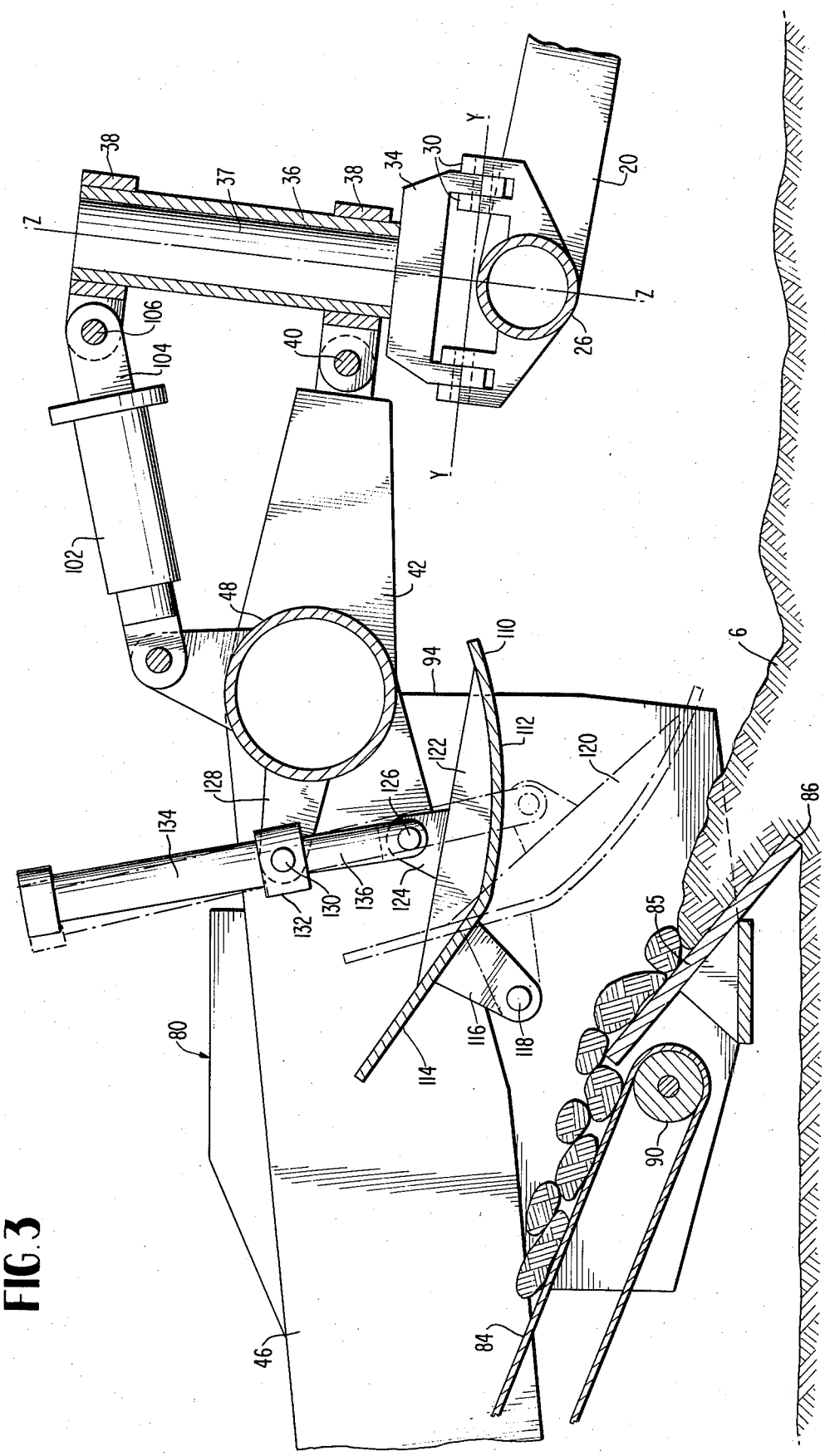
FIG. 3 is a sectional enlarged, elevational view of a portion of the apparatus of FIGS. 1 and 2, taken about line 3—3 of FIG. 2.

In order for the excavation and conveying apparatus of the present invention to raise the excavated material to a height sufficient that it will permit gravity deposition into the trailer bed 182 of the haul unit indicated in FIG. 2 at 180, understanding that both the bed 182 and the walls 184 of the haul unit trailer 186 may vary in height, the hydraulic cylinder 70 mounted to the rear prime mover 16 is located advantageously on the same side of the apparatus as the discharge end of the transverse endless conveyor 63. That is, pivoting of the rear end of the platform 44 occurs about a horizontal axis generally in line with boom 62 of the trailing prime mover 16 and this pivot action occurs as a result of extension or retraction of the piston rod 74 associated with hydraulic cylinder 70. Upon the application of pressurized hydraulic fluid to one side of the piston (not shown) within the cylinder, rod 74 extends. The extension of the rod 74 causes the discharge end of the transverse conveyor 63 to rise appreciably. The relative height change in the discharge end of the transverse conveyor 63 is determined by the distance between the pivot axis defined by boom 62, and the hydraulic cylinder 70, in relation to the distance between that same boom 62 axis, and the discharge end of the conveyor 63, and the amount of extension of piston rod 74. Thus, in the present invention, the loader is tilted as desired, not only to control the blade angle of horizontal blade 85, but most particularly the height above ground of the material discharged from the end of transverse conveyor 63.

From the above, it is seen that the loader frame or platform 44 is supported front and rear on the tractors forming the two prime movers with the loader and both tractors preferably being controlled by one operator operating the front tractor and in this respect, preferably the rear tractor and loader power controls (not shown) are provided in the front tractor and appropriate hydraulic connections being made of elements by way of conventional circuitry from the leading prime mover to hydraulic cylinders 102, 70, and 134 as well as to engine 62A and the control elements related to conveyor operation including gear boxes 164 and 166.

While the invention has been particularly shown and described with reference to a preferred embodiment thereof, it will be understood by those skilled in the art that various changes in form and details may be made therein without departing from the spirit and scope of the invention.

What is claimed is:

1. In an excavation and conveying apparatus which includes a horizontal loader platform movable relative to a stationary earth formation and supported between leading and trailing prime movers with said platform having fixedly secured thereto at its leading end, a rearwardly and upwardly inclined, rectangular, excavation blade defining a horizontal cutting edge with the blade extending generally transverse to the longitudinal axis of the platform, the improvement comprising:
   a first upwardly and rearwardly inclined, longitudinal endless conveyor belt mounted for rotation on said platform with its leading end underlying the trailing edge of the horizontal cutting excavation blade,
   a second transverse endless conveyor belt mounted for rotation below and to the rear of the raised trailing end of the first endless conveyor belt for receiving excavated material and for transporting said material transversely to a position to one side of the platform and above an underlying haul unit,
   paired booms extending forwardly of, and being mounted to said trailing prime mover for pivoting about a horizontal axis passing through the prime mover track center and being loosely coupled respectively, at their forward ends, to the sides of the platform, and
   a hydraulic cylinder operatively coupled to the boom on the same side of the platform as the discharge end of the transverse endless conveyor belt, and to the same side of the platform at a point above the coupling connection of that boom to said platform,
   whereby; extension of the hydraulic cylinder piston rod causes pivoting of said platform about a horizontal axis extending through the boom on the opposite side of the platform to effectively swing the discharge end of the transverse conveyor in a relatively large arc to allow the apparatus to adapt itself to haul units of varying height.

2. The excavation and conveying apparatus as claimed in claim 1, wherein said platform includes an extension portion overlying said trailing prime mover, said platform extension portion supporting a source of motive power for said conveyor belts to the side of said first longitudinal endless conveyor belt opposite to that facing said haul unit, said second transverse endless conveyor belt being mounted such that one end of the same extends beyond the side of the first endless conveyor belt facing said motive power source, said endless conveyor belts being mounted by way of respective drive rollers carried on said platform extension portion at the discharge end of said first endless conveyor belt with said belt trained thereabout, and at the inboard end of said second transverse endless conveyor belt with said second belt trained thereabout and being generally in line with said power source, shaft means extending from said power source, and transmission means operatively coupling said drive shaft to respective drive rollers for said belts to effect belt movement, whereby, the position of said motive power source and said belt drive transmission means generally overlies said horizontal pivot axis for said platform to reduce the power requirements in swinging of said discharge end of said transverse conveyor belt.

3. The excavation and conveying apparatus as claimed in claim 2, further comprising: a gate extending transversely across said platform and being pivotably mounted above said blade about a transverse horizontal axis so as to form with the underlying horizontal excavation blade, a variably sized throat for controlling passage of excavated material over said blade and onto said leading end of said longitudinal endless conveyor belt.

4. The excavation and conveying apparatus as claimed in claim 3, wherein said gate comprises a metal plate curved convexly in transverse cross section facing said blade, such that the throat narrows toward the center of the blade from the cutting edge of said excavation blade and widens from the center of the blade towards the trailing edge of the blade to restrict material input to the conveyor belts but allows the controlled flow of material to ride freely over the blade trailing edge and onto the first conveyor belt.

5. The excavation and conveying apparatus as claimed in claim 4, further comprising: a pair of diverging deflecting panels fixed to said platform and extending forwardly from a position to the rear of the leading end of the first longitudinal endless conveyor belt and terminating at a forward position beyond the horizontal excavation blade, said panels being fixed respectively to each side of said horizontal excavation blade and acting in conjunction with said blade and said gate to form said variably sized throat.

6. The excavation and conveying apparatus as claimed in claim 5, wherein: a pair of depending ears are fixed to respective sides of said plate, adjacent the deflecting panels and depend from said plate, and said means for pivotably mounting said plate to said platform comprises pins fixed to respective deflecting plates and being pivotably received by respective ears, and wherein said apparatus further comprises a hydraulic cylinder fixedly mounted to said platform and centered relative to said gate, said hydraulic cylinder including an extendable and retractable piston rod fixed at its outboard end to said gate, forward of the pivot axis and being movable under applied hydraulic fluid pressure to selectively adjust the angular position of said gate to vary the size of the throat formed between said plate, said excavation blade and said deflecting panels.

7. The excavation and conveying apparatus as claimed in claim 1, further comprising: a gate extending transversely across said platform and being pivotably mounted above said blade about a transverse horizontal axis so as to form with the underlying horizontal excavation blade, a variably sized throat for controlling passage of excavated material over said blade and onto said leading end of said longitudinal endless conveyor belt.

8. The excavation and conveying apparatus as claimed in claim 3, wherein said gate comprises a metal plate curved convexly in transverse cross section facing said blade, such that the throat narrows toward the center of the blade from the cutting edge of said excavation blade and widens from the center of the blade towards the trailing edge of the blade to restrict material input to the conveyor belts but allow the controlled flow of material to ride freely over the blade trailing edge and onto the first conveyor belt.

9. The excavation and conveying apparatus as claimed in claim 8, further comprising: a pair of diverging deflecting panels fixed to said platform and extending forwardly from a position to the rear of the leading end of the first longitudinal endless conveyor belt and terminating at a forward position beyond the horizontal excavation blade, said panels being fixed respectively to each side of said horizontal excavation blade and acting in conjunction with said blade and said gate to form said variably sized throat.

10. The excavation and conveying apparatus as claimed in claim 9, wherein: a pair of depending ears are fixed to respective sides of said plate, adjacent the deflecting panels and depend from said plate, and said means for pivotably mounting said plate to said platform comprises pins fixed to respective deflecting plates and being pivotably received by respective ears, and wherein said apparatus further comprises a hydraulic cylinder fixedly mounted to said platform and centered relative to said gate, said hydraulic cylinder including an extendable and retractable piston rod fixed at its outboard end to said gate, forward of the pivot axis and being movable under applied hydraulic fluid pressure to selectively adjust the angular position of said gate to vary the size of the throat formed between said plate, said excavation blade and said deflecting panels.

11. In an excavation and conveying apparatus which includes a horizontal loader platform movable relative to a stationary earth formation and supported between leading and trailing prime movers and wherein said platform has fixedly secured thereto at its leading end, a rearwardly and upwardly inclined rectangular excavation blade defining a horizontal cutting edge with the blade extending generally transverse to the longitudinal axis of the platform and said platform further comprises at least one upwardly and rearwardly inclined, endless conveyor belt mounted for rotation on the horizontal platform with its leading end underlying the trailing edge of the horizontal excavation blade to move excavated material deposited thereon away from said horizontal excavation blade, the improvement comprising: a gate extending transversely across the platform and above the blade, said gate comprising a metal plate pivotably mounted to said platform for rotation about a transverse horizontal axis near its rear edge and forming with the underlying horizontal excavation blade, a variably sized converging throat to press the excavated material downward onto the blade and towards the leading end of said endless conveyor.

12. The excavation and conveying apparatus as claimed in claim 11, wherein said metal plate is convex in lateral cross section facing the blade such that the throat narrows at the center of the blade from the cutting edge and widens from the center towards the trailing edge of the blade to restrict material input to the conveyor, force the excavated material onto the blade as the apparatus moves forward and permit the controlled flow of material to freely ride over the blade trailing edge and to fall onto the conveyor belt.

13. The excavation and conveying apparatus as claimed in claim 12, further comprising a pair of diverging deflecting panels fixed to the platform and extending forwardly from positions on respective sides of the conveyor belt to a point extending beyond the leading edge of said horizontal excavation blade and acting in conjunction with said blade to facilitate deposition and controlled flow of excavated material onto the leading end of said endless conveyor.

* * * * *